United States Patent [19]
Muti

[11] Patent Number: 4,536,960
[45] Date of Patent: Aug. 27, 1985

[54] CALIPERS ARRANGED FOR REMOTE READING

[76] Inventor: Elliott J. Muti, 3423 E. Pratt St., Baltimore, Md. 21224

[21] Appl. No.: 631,828

[22] Filed: Jul. 13, 1984

[51] Int. Cl.³ .......................... G01B 5/02; G01B 5/12
[52] U.S. Cl. ................................ 33/143 M; 33/161; 33/178 R
[58] Field of Search ............. 33/143 R, 143 M, 143 J, 33/147 T, 147 K, 158, 160, 161, 178 R, 296

[56] References Cited

U.S. PATENT DOCUMENTS

| | | | |
|---|---|---|---|
| 1,238,045 | 8/1917 | Nelson | 33/143 M |
| 1,735,892 | 11/1929 | Clausen et al. | 33/296 |
| 2,583,205 | 1/1952 | Boisen | 33/161 |
| 2,648,133 | 8/1953 | Kosmoski et al. | 33/143 M |
| 3,995,373 | 12/1976 | Brumbelow | 33/143 M |

FOREIGN PATENT DOCUMENTS

| | | | |
|---|---|---|---|
| 77381 | 2/1949 | Czechoslovakia | 33/143 M |
| 491529 | 2/1930 | Fed. Rep. of Germany | 33/296 |
| 1376464 | 9/1964 | France | 33/143 M |
| 74141 | 1/1917 | Switzerland | 33/143 J |

*Primary Examiner*—Richard R. Stearns
*Attorney, Agent, or Firm*—Walter G. Finch

[57] ABSTRACT

The invention is an improved calipers that is arranged for reading at a remote distance from the object being measured, for either inside or outside diameters. The need for a calipers capable of being read at a remote distance is experienced when an item to be measured, such as a pipe, is below ground level in a manhole or drain catch basin, or at some elevated location above ground or floor level that is not readily accessible. The present invention of a calipers eliminates climbing down into a manhole or a drain opening where a ladder may be absent or not readily available or where dangerous gases may be present, or at an elevation above floor or ground level when a ladder is not readily available. The invention consists of a pair of sliding rod members to define the dimensional reading, a pair of dimensional point indicators, a plurality of sliding rod combined coupler-guides, and a plurality of affixing members for connections. The sliding rod members may be in a plurality of sections.

22 Claims, 6 Drawing Figures

CALIPERS ARRANGED FOR REMOTE READING

BACKGROUND AND SUMMARY OF THE INVENTION

The invention relates to measurement tools and in particular to calipers. Specifically, it relates to an improved caliper capable of being arranged for reading the measurement of an object at a remote distance from the object being measured.

The invention is arranged primarily for reading inside diameters or distances and outside diameters or distances at inaccessible locations, such as at the bottom of a manhole or a drain catch basin below ground or floor level, or such as at an an elevated location above ground or floor level where access means is not readily available.

When dimensions or measurements must be taken of inlet or outlet pipes at the bottom of a manhole or drain catch basin, there may be problems. Such as the manhole or drain catch basin may not have a built in ladder system, or a ladder may not be readily available. Also, there may be dangerous gases present in the manhole or drain catch basin which dictates that a person should not descend into the manhole or catch basin for safety reasons.

Likewise, when dimensions or measurements must be taken at an elevated location well above the floor or ground level and access means are not at hand or readily available, there then exists a problem.

Then, too, some manholes or drain catch basins may have covers which are difficult to remove, but which have openings in the surface that are large enough to pass the present invention through in order to take the measurements without removing the cover on the manhole or the catch-basin.

Although inside and outside diameters of pipes, such as inlets and outlets in a manhole, have been mentioned hereinbefore, it is to be understood that the calipers of this invention may be utilized to measure other objects and geometrical openings or widths. Such variations are within the scope and intent of this invention.

When used to obtain the various dimensions and measurements mentioned hereinbefore, the actual reading is taken where the user of the calipers is located, which is remote from the object being measured.

The design of the calipers of this invention also makes it possible to measure the depth of manholes, drain catch basins, and other such structures below ground or floor level as well as the height of various structures above floor or ground level.

In the prior art when it is necessary to measure the inside or outside diameters of inlets or outlets in manholes or catch basins or other similar structures it requires a person to climb down into the manhole or catch basin and make the measurement. Likewise, when it is necessary to measure an overhead pipe or duct or other structure it requires a person to climb up a ladder to get the measurement. The present invention eliminates these problems and, at the same time, makes it possible to perform the work in safety.

The device of the present invention consists of a pair of sliding rod members with which the measured dimension is defined. A plurality of sliding rod combined coupler-guides that maintain the sliding rod members in alignment and are coupled to each other. The sliding rod members may be assembled from a plurality of sections of the rod members. A pair of dimensional point indicators on the sliding rod members delineate the span of the points to be measured. A plurality of various affixing means are used as connectors to assemble the other elements and components of the device.

The present invention is of a size and arranged so that it may be used by passing it through the openings in a grating to obtain certain measurements when a grating may be heavy or difficult to remove without mechanical assistance.

The scale markings for measurements may be marked on the sliding rod in inches, decimals of a foot, and in a metric scale. The triangular configuration of the sliding rod facilitates the inclusion of all three scales on the rod concurrently.

It is, therefore, an object of the invention to provide a device for making measurements by calipers that are arranged for remote reading.

It is another object of this invention to provide a device for making measurements by calipers of objects in inaccessible locations and reading the measurements at a remote location.

It is also an object of this invention to provide a device for making measurements by calipers of objects in manholes and other structures below ground or floor level and reading the measurements at a remote location.

It is still another object of this invention to provide a device for making measurements by calipers of objects above ground or floor level and reading the measurements at a remote location.

It is yet another object of this invention to provide a device for making measurements by calipers of objects in remote locations wherein the device may be assembled and disassembled easily for storage and transporting.

Further objects and advantages of the invention will become more apparent in light of the following description of the preferred embodiments.

DESCRIPTION OF THE PREFERRED EMBODIMENT

Figure 1:
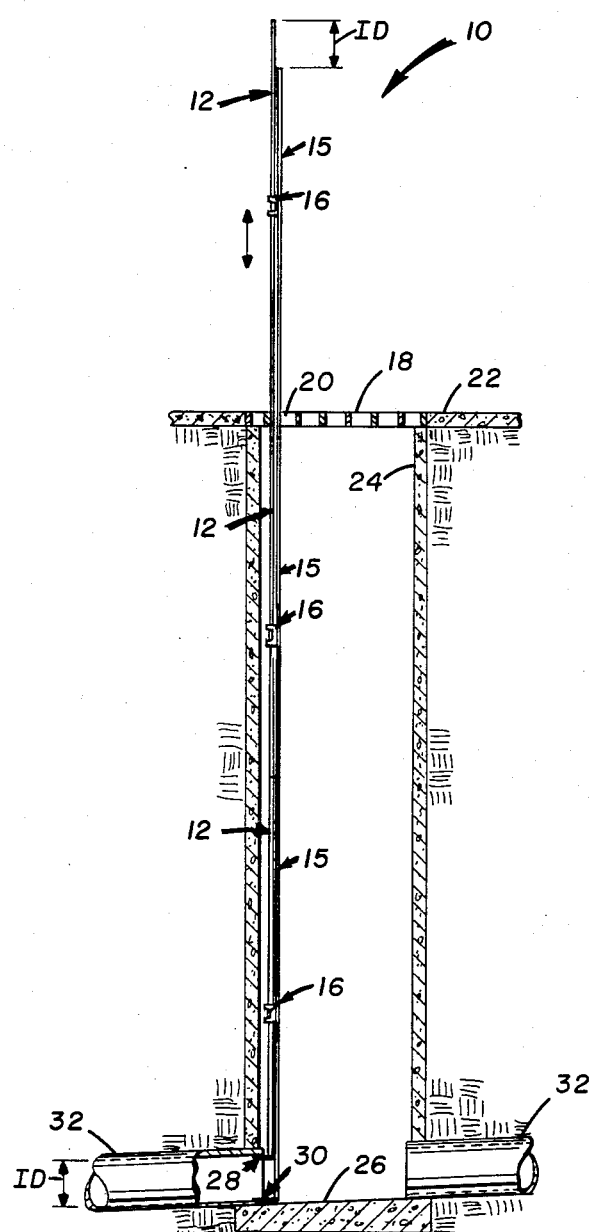
FIG. 1 is a side elevation of calipers arranged for remote reading shown set for making an inside diameter measurement in a cross-section of a catch basin structure.
Figure 2:
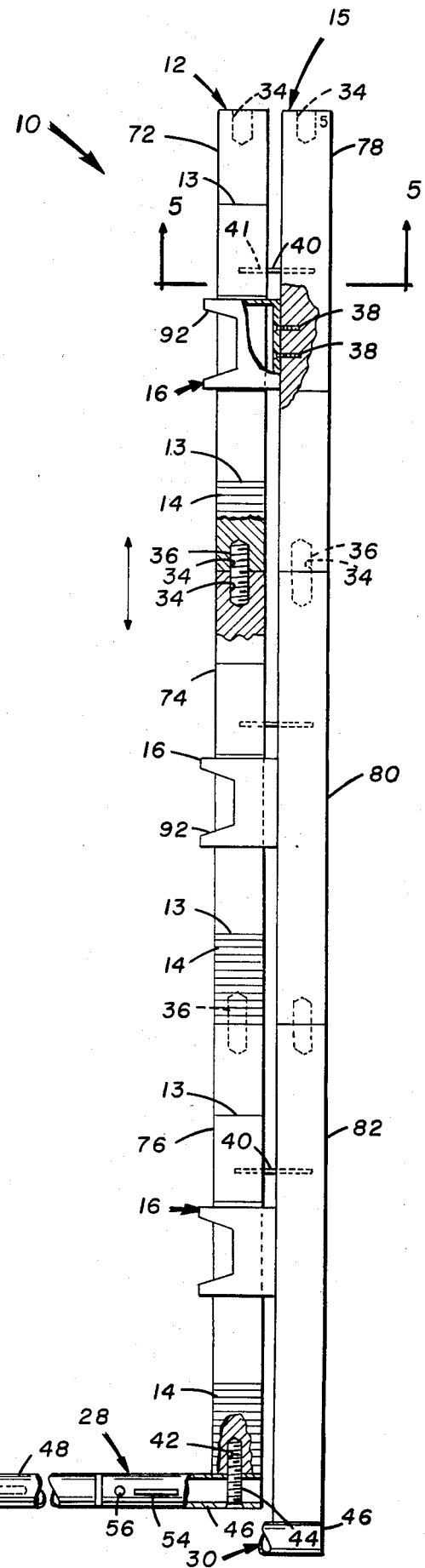
FIG. 2 is an enlarged side elevation of the calipers arranged for remote reading shown in FIG. 1.

Referring now to the drawings, and particularly to FIGS. 1 and 2, a calipers arranged for remote reading of a measurement is shown at 10.

FIG. 1 shows the calipers arranged for remote reading of a measurement set for making an inside diameter measurement, the setting for making the inside diameter measurement is shown in a cross section of a catch basin structure, the details of which are described hereinafter.

FIG. 2 shows an enlarged side elevation of the calipers arranged for remote reading. Partial cross sections on the side elevation indicate the assembly means by which a plurality of elements and components of the device are assembled. The details of the various elements and components and the assembly are described hereinafter.

Referring now to FIG. 1, the major components of the calipers arranged for remote reading 10 are a stable or stationary rod member 15, a mobile or moveable rod member 12, a plurality of combined coupler-guide members 16, a stationary or base dimensional point indicator 30, and a moveable or marking dimensional point indicator 28. The elements of these components of the calipers arranged for remote reading are described hereinafter.

It is to be noted that the stable or stationary rod member 15 and the mobile or moveable rod member 12 may be referred to as scale rod members, sliding rod members, or other such designations. Any and all such variations are within the scope and intent of the present invention.

In FIG. 1, the calipers arranged for remote reading 10 are shown in position in a catch basin 24 which is covered by a grating 18 at grade level 22. The catch basin 24 has an inlet pipe 32 (shown at the right side of the drawing) and an outlet pipe 32 (shown at the left side of the drawing) at the bottom 26 of the catch basin 24.

It is to be noted that the catch basin 24 may also be considered as illustrating a manhole or other structure below the ground or floor level at a grade level 22. In such variations the grating 18 could be a manhole cover, trapdoor, or other similar closure means.

As shown in FIG. 1, the calipers arranged for remote reading 10 are set for measuring the inside diameter, shown as "ID", of the pipe 32, in the illustration of the outlet side. As shown, the stationary or base dimensional point indicator 30 is positioned against the bottom surface of the inside of the pipe 32 and the moveable or marking dimensional point indicator is positioned against the top surface of the inside of the pipe 32. However, it is to be noted that the calipers arranged for remote reading 10 may be used for measuring the dimensions of any other object in such an underground or underfloor location that is not readily accessible, as long as the dimensional point indicators 28 and 30, respectively, can span or bracket the object to be measured.

In order to position the moveable or marking dimensional point indicator 28 against the top surface of the inside pipe 32, the mobile or moveable rod member 12 is slidably raised through the plurality of combined coupler-guide members 16 until the moveable or marking dimensional point indicator 28, which is affixed to the bottom of the mobile or moveable rod member 12, rests against the top surface of the inside of the pipe 32. Thus, the exterior or outer surfaces or edges of the two dimensional point indicators 28 and 30 are marking or indicating the inside diameter ("ID") of the pipe 32.

Concurrently with the movement or sliding of the mobile or moveable rod member 12 upwardly through the plurality of combined coupler-guide members 16, the upper or top end of the mobile or moveable rod member 12 moves an equivalent distance above the upper or top end of the stable or stationary rod member 15.

By calibrating the mobile or moveable rod member 12 to read at the end the actual total "thickness" of the combined moveable or marking dimensional point indicator 28 and the stationary or base dimensional point indicator 30 when the two rod members 12 and 15 are collapsed or set in "closed" position, the actual dimensional amount of movement will then be indicated on the calibrated scale on the mobile or moveable rod member 12, at the top or upper end, and will be the inside diameter of the pipe 32, shown as "ID" at the top or upper end of the mobile or moveable rod member 12, the movement being the distance between the topmost point of the mobile or moveable rod member 12 and the topmost point of the stable or stationary rod member 15.

In other words, whatever the total thickness dimension is of the two dimensional point indicators 28 and 30 when collapsed together in the stationary position, that dimension will be initial dimension indicated at the very top of the mobile or moveable rod member 12. Thus, the smallest pipe inside diameter or inside dimension of an object that can be measured is the total combined thickness of the two dimensional point indicators 28 and 30.

The two rod members 12 and 15 may be made up of a plurality of separate sections which provide a means for assembling the calipers device 10 in a convenient plurality lengths and provides for easy transport or storage in the disassembled condition. The details of the assembly and disassembly of the plurality of sections of the caliper device 10 is described hereinafter in connection with FIG. 2.

In both FIGS. 1 and 2 the double end arrow adjacent to and spaced from the mobile or moveable rod member 12 indicates the two directional movements that take place when setting the calipers device 10 for taking a measurement.

FIG. 1 also illustrates how the calipers device 10 may be passed through an opening 20 in a grating 18 when the weight of the grating 18 is too heavy to lift or move or requires mechanical means to remove it.

In a manner similar to taking measurements in inaccessible locations below ground or floor level as illustrated by FIG. 1, the calipers device 10 can also be used for taking similar dimensions or measurements overhead or above ground or floor level that are inaccessible or inconvenient to reach. The calipers 10 is simply raised in the upward direction and the measurements made in a manner similar to that described for measurements below ground or floor level.

It is also to be noted that the calipers device 10 may also be used to measure the depth of a structure below ground or floor level, or the height above ground or floor level.

Turning now to FIG. 2 which is an enlarged side elevation of the calipers device 10 shown in FIG. 1. Fig. 2 shows the various elements of the aforementioned components 12, 15, 16, 28, and 30. The elements of these components are described hereinafter, together with a description of the assembly and disassembly. FIGS. 3, 4, 5, and 6 are utilized in the detailed descriptions associated with FIG. 2.

The elongated mobile or moveable rod member 12 is shown in FIG. 2 as being an assembly of three sections 72, 74, and 76. The elongated stable or stationary rod member 15 is shown in FIG. 2 as being an assembly of three sections 78, 80, and 82.

It is to be noted that the plurality of sections of components 12 and 15 is illustrative and it is to be understood that the component mobile or moveable rod member 12 and the component stable or stationary rod member 15 may be utilized as being of one section, such as 72, and 78, respectively, or any plurality of such sections, depending upon the depth or height which must be reached.

Figure 5:
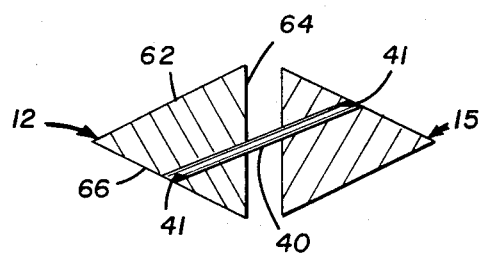
FIG. 5 is a cross-sectional view on line 5—5 of FIG. 2.

The components 12 and 15 are each triangular in cross section as can be seen in FIG. 5. The triangular cross section of each component 12 and 15 may have equal length sides or have one side slightly shorter than the other two sides, when assembled and one side is slightly shorter as noted the short side of component 12 and component 15 are assembled to face each other as may be noted in FIG. 5.

Each section 72, 74, and 76 of component 12 and each section 78, 80, and 82 of component 15 have a threaded aperture 34 in each end for assembly into component 12 and 15, respectively. The plurality of threaded apertures 34 in each end of the noted sections of components 12 and 15, respectively, can be seen in FIG. 2.

A screw means 36 without a head is used to assemble the plurality of sections 72, 74, and 76, in various combinations to form the mobile or moveable rod member component 12, and a screw means 36 without a head is also used to assemble the plurality of sections 78, 80, and 82, in various combinations to form the stable or stationary rod member component 15. The plurality of screws means 36 can be seen in FIG. 2 in both of the components 12 and 15. The plurality screw means 36 are threadably assembled into the plurality of threaded apertures 34 as shown in FIG. 2. Each screw means 36 jointing a pair of the sections, such as 72 and 74, or 78 and 80, end to end, when screwed into the respective threaded apertures 34.

Once the mobile or moveable rod member component 12 is assembled with stable or stationary rod member component 15 by means of the combined coupler-guide component 16, the assembly may be passed through grating 18 openings 20 as hereinbefore mentioned. Details regarding the dimensional point indicators 28 and 30 respectively, passing through the grating 18 openings 20 will be described hereinafter. However, it is to be noted that passing the calipers device 10 through the grating 18 openings 20 is only possible where the grating openings 20 are large enough for the calipers device 10 to pass through, otherwise the grating 18 must be removed.

Figure 3:
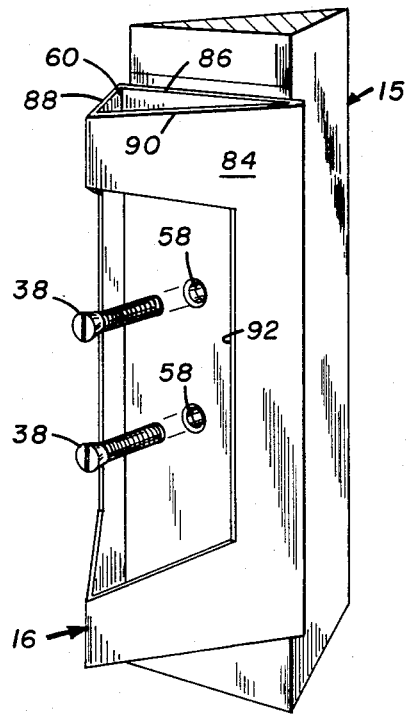
FIG. 3 is an enlarged perspective view of a combined coupler-guide for assembling a calipers arranged for remote reading.

The coupler-guide component 16 consists of a hollow triangular configured body member 84 having the sides 86, 88, and 90, which sides form the hollow triangular configuration 60 of the hollow triangular configured body member 84 as shown in FIG. 3. The interior of the hollow triangular configuration is such that the triangular configuration of mobile or moveable rod member component 12 may be slidingly assembled therethrough.

The hollow triangular configured body member 84 has a window or access opening 92 cut therein so that countersunk mounting screws 38 may be passed through countersunk apertures 58 in side 86 of the hollow triangular configured body member 84 and into a mating threaded aperture in the stable or stationary rod member component 15 as shown in FIG. 3. Thus, at least one coupler-guide component 16 will be assembled to each section 78, 80, and/or 82, respectively, of the stable or stationary rod member component 15.

The mobile or moveable rod member component 12 is slideably and removeably inserted into the hollow triangular configuration 60 for movement up and down or through and within the confines of the hollow triangular configuration 60 when making a measurement with the present invention.

Thus, the size of the hollow triangular configuration 60 must be such that the mobile or moveable rod member component 12 can be moved easily upward and downward slidingly through the hollow triangular configuration 60 without sticking or jamming. In that regard it is also important that each of the combined coupler-guide member components 16 are aligned vertically with each other to prevent sticking or jamming. The combined coupler-guide member component 16 couples the mobile or moveable rod member component 12 to the stable or stationary rod member 15 and, concurrently, serves as a guide to keep the mobile or moveable rod member component 12 in line to move in directions parallel with the stable or stationary rod member component 15 when making a measurement.

Both the mobile or moveable rod member component 12 and the stable or stationary rod member component 15 have a locking pin 40 that fits in aligned apertures 41 in each of the rod member components 12 and 15. This locking pin 40 and the aligned apertures 41 can be seen in FIGS. 2 and 5. The locking pin 40 is useful when an assembled pair of rod member components 12 and 15 are to be transported to keep them from sliding along each other. At least one such locking pin 40 (with aperture 41) should be provided in each section of rod member components 12 and 15, although only one locking pin 40 needs to be used to immobilize the tendency to slide. The locking pin 40 with apertures 41 are shown in FIG. 2.

Only the mobile or moveable rod member component 12 has scale markings on it for measurements. The top or upper end of the stable or stationary rod member component 15 is used to designate where on the mobile or moveable rod member the scale markings are to be read to obtain the desired measurement. This can be seen in FIG. 1 where an inside diameter measurement of a pipe 32 is shown as "ID" at the top of the two rod member components 12 and 15 which has been described hereinbefore. For an outside diameter measurement of a pipe 32, this can be seen in FIG. 6 at the top of the rod member components 12 and 15, and which will be described hereinafter.

The scale markings are marked or engraved on the the three faces of the triangularly configured mobile or moveable rod member component 12 as is illustrated for one face in FIG. 2. All scale markings are not shown but illustrative lines are provided as an example. Main scale marks 13, such as at each foot, or each metric major division chosen, may be suitable marked by a heavier line, or a colored line, or with the numeral for that point on the scale. Intermediate scale marks 14 can then be suitably marked between the main scale marks 13 by fine lines, or lines of a different color, or by the intermediate numeral designation.

One face 64 of the three faces of the triangular configuration can be used for foot and inch measurement designations, one face 62 for foot and decimals of a foot measurement designations, and one face 66 for metric system measurement designations, or any other desired selection of a measurement scale combination.

It is to be noted, that for an inside diameter or inside measurement of an object, as described hereinbefore, and using FIG. 1 as an example, the dimensional point indicator 30 will be unscrewed (taken out) from the stable or stationary rod member 15 in this way the stable or stationary rod member 15 will lay on the invert of the pipe with 0 (zero). So calibration will start at bottom of stable or stationary rod member 15.

When sliding up mobile rod member 12, the top of dimensional point indicator 28 will touch the crest or highest inside point of the pipe also with 0 (zero) because the top of 28 is aligned with the bottom of mobile rod member 12 with 0 (zero) thus giving a true measurement. The purpose of dimensional point indicator 28 is to the inside top of pipe 32 and when no thickness is involved.

Figure 6:
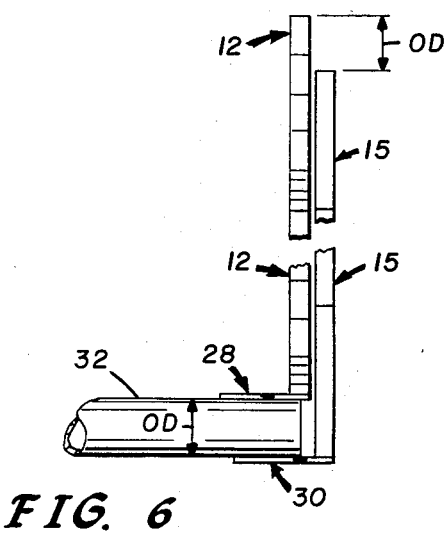
FIG. 6 is a partial side elevation of calipers arranged for remote reading shown set for making an outside diameter measurement.

For outside diameter some changes must be done. Referring to FIG. 6 for example, the calibration for stable or stationary rod member begins at the bottom of 15, which is aligned with the top of dimensional point indicator 30. But for mobile rod member 12, the calibration must start at bottom of dimensional point indicator 28 because it is the bottom of such deminsional point indicator that feels and touches the pipe. Therefore, in this case only one and precisely the lowest rod member 12 must be shorter of stable or stationary rod member 15 of the thickness of dimensional point indicator 28.

However, it is the scope and intent of this invention to adapt the method for the best performance. A flashlight may be needed in many cases because of the nature of the operation.

Therefore, in order to accommodate the scale markings for both inside diameters or inside measurements, and outside diameters or outside measurements, one side or edge of each face of the triangular configured mobile or moveable rod member 12 must be used for the inside diameters or measurements, and one side edge of the same face must be used for the outside diameters or measurements. The matter of "inside" or "outside" can be designated at the top of the mobile or moveable rod member component 12, or at intervals along the length of the rod member component.

Because the rod member components 12 and 15 combination may also be used to measure the depth or height of a catch basin, or elevated structure, or other structure, the scale markings 13 and 14 for the "inside" measurements must be in sequential order and marked on all of the sections 72, 74, and 76 of the mobile or moveable rod member component 12. Note, too, that while only three sections 72, 74, and 76 have been shown for illustration purposes, it is to be understood that there may be any number of such sections within the realm of being practical. Thus, when assembling the calipers device 10 care must be taken to assemble the sections in the order of scale readings, and in the number of sections for the depth concerned. In making a depth or a height measurement the calipers device arrangements must be reversed in order to read the depth or height measurement direct, otherwise the depth must be calculated by deducting the dimension showing above the grade point.

Figure 4:
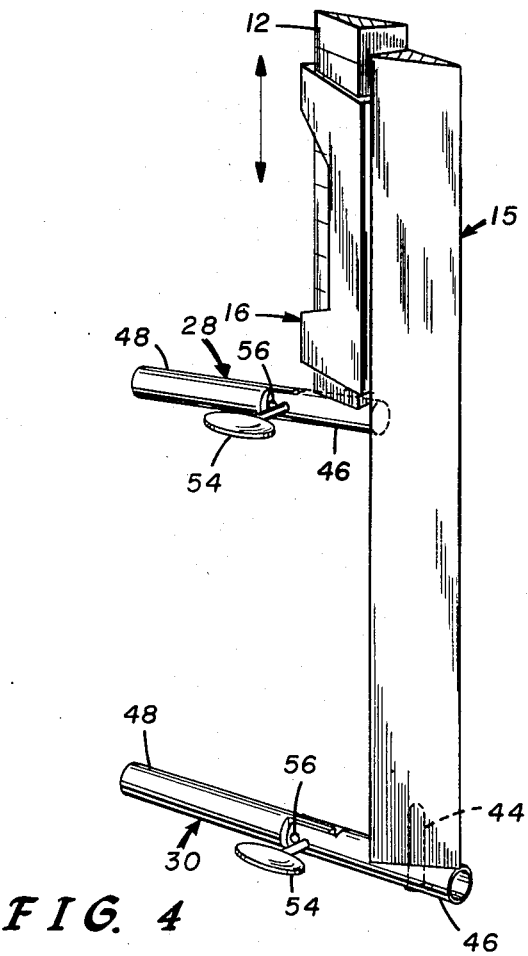
FIG. 4 is an enlarged perspective view of a portion of a calipers arranged for remote reading, showing the dimensional point indicators of the device.

Turning now to FIGS. 2, 4, and 6, the details of the dimensional point indicators 28 and 30 can be seen. Each dimensional point indicator must consist of at least the first element or basic indicator means 46. The basic indicator means 46 is used for both the moveable dimension point indicator 28 and the stationary dimension point indicator 30.

The moveable basic indicator means 46 suitably affixed to the bottom of the mobile or moveable rod member component 12 by a countersunk bolt means 44 through an aperture in the basic indicator means 46 and into a mating threaded aperture 42 in the bottom of the mobile or moveable rod component 12.

The stationary basic indicator means 46 is suitably affixed to the bottom of the stable or stationary rod member component 15 by a countersunk bolt means through an aperture in the basic indicator means 46 and into a mating threaded aperture 42 in the bottom of the stable or stationary rod member component 15.

It is to be noted and understood that in all cases of the designation herein of bolts or countersunk bolts, or other affixing means, that any suitable means for affixing the elements or components in place is within the scope and intent of this invention.

When the moveable and/or the stationary dimensional point indicators 28 and/or 30, respectively, must be made longer than the basic indicator element 46, extending indicator elements 48 and if necessary 50 are added to the basic indicator element 46.

As illustrated basic and extending indicator elements 46, 48, and 50 are pipe or tube or rod like, however, it is to be noted and understood that it is within the scope and intent of the invention to make these elements of any other configuration.

To fix intermediate indicator element 48 to the basic indicator element 46 a fin means on the intermediate indicator element 48 is fitted into a mating slot in the basic indicator element 46 as shown in FIG. 4. A pressure screw 54, thumb screw type, maintains the two elements in tight alignment and a pin means 56 locks the two elements together.

To fix the extending indicator element 50 to the intermediate indicator element 48 a suitable screw means 52 in threaded apertures in the ends of the two indicator elements 50 and 48, respectively, affixes them to each other.

It is to be noted that any other suitable means of affixing the various elements of the dimensional point indicators 28 and 30 to each other, or any combination of the affixing means shown herein, are all within the scope and intent of the present invention.

Turning now to FIG. 6 to describe the taking of an outside diameter or outside measurement with the calipers device 10, the process is similar to that described hereinbefore for taking inside diameter or inside measurement readings.

Describing, as an example, the taking of a measurement of an outside diameter of a pipe 32 the calipers device 10 is descended into a below ground pit, manhole, catch basin or other similar structure, or raised to an overhead structure in preparation for making the measurement. The moveable dimensional point indicator 28 is first slidably moved so that the inner face of it which, when closed, interfaces with the inner face of the stationary dimensional point indicator 30, is now opened to a gap distance between the two faces of the moveable and stationary dimensional point indicators 28 and 30, respectively.

The opening or gap between the two inner faces of the two dimension point indicator components 28 and 30 is then placed around the outside of the pipe or object to be measured and the moveable dimensional point indicator component 28 is then slidably moved to touch the pipe or object being measured, with the stationary dimensional point indicator component 30 touching the opposite side. The outside diameter or measurement is then read as "O.D." as shown in FIG. 6 at the top or upper end of the rod member components 12 and 15.

Thus, the calipers device 10 is designed so that it is a calipers arranged for remote reading 10 of the measurement spanned by the dimensional point indicators 28 and 30, either as an inside diameter or a dimension across an opening in an object, or as an outside diameter or a dimension across an object.

The calipers device 10 can be disassembled for easy storage and transport, and is very simple to reassemble when needed.

The mobile or moveable rod member component 12 and the stable or stationary rod member component 15 may be made from stainless steel, plastics, woods, or any other suitable material. The rod members 12 and 15 may be formed as hollow triangular structures or as solid materials, however, when hollow structures are used, a filling material must be used at the points where screws 36, 38, and 44 are inserted.

The other components of the structure, the combined coupler-guide 16, and the dimensional point indicators 28 and 30, may also be made of stainless steel, plastics, or any other suitable material.

When passing the calipers device 10 through a grating 18 opening 20, as described hereinbefore, the dimensional point indicators 28 and 30 must be loosened and raised in order to pass the assembled structure through the grating 18 opening 20 (if the opening 20 is not large enough for a direct pass through), after which the user must reach through a grating 18 opening 20 and realign the dimensional point indicators 28 and 30 and retighten the affixing means. When withdrawing the calipers device 10 the operation is reversed.

As can be readily understood from the foregoing description of the invention, the present structure can be configured in different modes to provide the ability to make remote measurements by a calipers means.

Accordingly, modifications and variations to which the invention is susceptible may be practiced without departing from the scope and intent of the appended claims.

What is claimed is:

1. A calipers device, said calipers device being arranged for remote reading of the measurement taken, comprising:
    a first rod member;
    a second rod member;
    a plurality of coupler-guide members, said plurality of coupler-guide members being suitably affixed to said second rod member, each of said plurality of coupler-guide members being triangular in cross section configuration, said coupler-guide members each having a passageway therethrough, said first rod member being removably inserted through said passageways in said plurality of coupler-guide members and capable of slidingly moving in either direction through said passageways in said plurality of coupler-guide members when said second rod member is in a stationary position;
    a first measuring point contact means, said first measuring point contact means being suitably affixed to said first rod member; and
    a second measuring point contact means, said second measuring point contact means being suitably affixed to said second rod member.

2. A calipers device as recited in claim 1, wherein said first rod member and said second rod member each consists of a plurality of sections, said sections of said first and second rod members, respectively, being suitably removably affixed to each other end to end to form said first and said second rod members individually.

3. A calipers device as recited in claim 2, wherein a transverse cross section through said first and said second rod members is triangular in configuration and thereby each said section of said plurality of sections of said first and said second rod members are each triangular in configuration.

4. A calipers device as recited in claim 3 and additionally, a plurality of markings, said markings being engraved upon said first and said second rod members, said markings being scale markings of measurements made by said calipers device.

5. A calipers device as recited in claim 3, wherein said triangular cross section configuration of said first rod member provides three faces of said first rod member upon which said plurality of markings may be engraved, said plurality of markings being engraved upon said first rod member only, said second rod member having no engraved markings thereon.

6. A calipers device as recited in claim 5, wherein said engraved markings are engraved on each of said three faces of said first rod member, said plurality of markings being divided into three distinctly different modes of measurements, one of said three distinct modes of measurements being engraved on each of said three faces of said first rod member.

7. A calipers device as recited in claim 6, wherein said three distinctly different modes of measurements are: a first mode of feet and inches; a second mode of feet and decimals of a foot; and a third mode of metric system measurements.

8. A calipers device as recited in claim 7, wherein said engraved three distinctly different modes of markings are further differentiated as inside measurements and outside measurements, said inside measurements being engraved along one edge of said face where engraved upon, and said outside measurements being engraved along the other edge of said face where engraved upon.

9. A calipers device as recited in claim 3 and additionally, at least one securing pin means, said securing pin means being for the purpose of securing said first rod member to said second rod member, said at least one securing pin means being inserted in one of a plurality of mating pairs of apertures in and through said first and second rod members, said plurality of mating pairs of apertures being so located so that at least one mating pair of apertures is in each of said sections of said first and second rod members, each said mating pair of apertures being in and through said triangular cross section of said first and second rod members.

10. A calipers device as recited in claim 2, wherein said sections of said first and said second rod members suitably removably affixed to each other end to end are removably affixed to each other by headless screw means in mating threaded apertures in each end of each said section of said first and said second rod members.

11. A calipers device as recited in claim 1, wherein said plurality of coupler-guide members each have an access opening therein, said access opening being cut from two faces of two sides of said triangular configuration, thereby exposing access to the inside face of the third side of said triangular configuration.

12. A calipers device as recited in claim 11, wherein said plurality of coupler-guide members suitably affixed to said second rod member are affixed by countersunk head screws through countersunk apertures in said inside face of said third side and into mating threaded apertures in said second rod member.

13. A calipers device as recited in claim 1, wherein said first measuring point contact means consists of at least a first basic member, said first basic member being suitably affixed to the lowermost end of said first rod member.

14. A calipers device as recited in claim 13, wherein said first basic member suitably affixed to said first rod member is so affixed by a countersunk flat head screw means in a mating countersunk aperture in and through said first basic member and into a mating threaded aperture in said lowermost end of said first rod member.

15. A calipers device as recited in claim 13 and additionally, at least one first intermediate extension member of said first measuring point contact means, said first intermediate extension member being suitably affixed to said first basic member thereof.

16. A calipers device as recited in claim 15, wherein said first intermediate extension member is suitably affixed to said first basic member by a combination of a first fin means projecting from an inboard end of said first extension member fitted into a mating first slot means in an adjacent distal end of said first basic member, a pin means for securing the affixation by passing in and through a continuous mating aperture through projecting sides of said first slot means and said first fin means therebetween, and further immobilized by a thumb screw means in and through a threaded aperture in at least one of said projecting sides of said slot means so as to bear upon a side of said first fin means in said first slot means.

17. A calipers device as recited in claim 16 and additionally, at least one first distal extension member of said first measuring point contact means, and a headless screw means in mating threaded apertures in the inboard end of said first distal extension member and in the distal end of said first intermediate extension member.

18. A calipers device as recited in claim 1, wherein said second measuring point contact means consists of at least a second basic member, said basic member being suitably affixed to the lowermost end of said second rod member.

19. A calipers device as recited in claim 18 and additionally, at least one second intermediate extension member of said second measuring point contact means, said second intermediate extension member being suitably affixed to said second basic member thereof.

20. A calipers device as recited in claim 19, wherein said second intermediate extension member is suitably affixed to said second basic member by a combination of a second fin means projecting from an inboard end of said second extension member fitted into a mating second slot means in an adjacent distal end of said second basic member, a pin means for securing the affixation by passing in and through a continuous mating aperture through projecting sides of said second slot means and said second fin means therebetween, and further immobilized by a thumb screw means in and through a threaded aperture in at last one of said projecting sides of said slot means so as to bear upon a side of said second fin means in said second slot means.

21. A calipers device as recited in claim 20 and additionally, at least one second distal extension member of said second measuring point contact means, and a headless screw means positioned in mating threaded apertures in the inboard end of said second distal extension member and in the distal end of said second intermediate extension member for affixing said second intermediate extension member to said second intermediate extension member.

22. A calipers device as recited in claim 18, wherein said second basic member suitably affixed to said second rod member is so affixed by a countersunk flat head screw means in a mating countersunk aperture in and through said second basic member and into a mating threaded aperture in said lowermost end of said second rod member.

* * * * *